US012759013B2

(12) United States Patent
Wiedemann et al.

(10) Patent No.: US 12,759,013 B2
(45) Date of Patent: Oct. 13, 2026

(54) DISPENSER AND A CONTROL METHOD OF THE DISPENSER

(71) Applicant: Hilti Aktiengesellschaft, Schaan (LI)

(72) Inventors: Michael Wiedemann, Koenigsbrunn (DE); Rocco Stolt, Niederraunau (DE)

(73) Assignee: Hilti Aktiengesellschaft, Schaan (LI)

( * ) Notice: Subject to any disclaimer, the term of this patent is extended or adjusted under 35 U.S.C. 154(b) by 215 days.

(21) Appl. No.: 18/256,385

(22) PCT Filed: Nov. 16, 2021

(86) PCT No.: PCT/EP2021/081800
§ 371 (c)(1),
(2) Date: Jun. 7, 2023

(87) PCT Pub. No.: WO2022/122312
PCT Pub. Date: Jun. 16, 2022

(65) Prior Publication Data
US 2024/0017288 A1 Jan. 18, 2024

(30) Foreign Application Priority Data
Dec. 10, 2020 (EP) .................................... 20212973

(51) Int. Cl.
*B05C 17/01* (2006.01)
*B05C 17/005* (2006.01)

(52) U.S. Cl.
CPC .... *B05C 17/0103* (2013.01); *B05C 17/00553* (2013.01)

(58) Field of Classification Search
CPC ......... B05C 17/0103; B05C 17/00553–00566; A61C 2204/005; A61C 5/64
See application file for complete search history.

(56) References Cited

U.S. PATENT DOCUMENTS 4,067,479 A * 1/1978 Moline ............. B05C 17/00566 222/137
5,027,981 A * 7/1991 Magister .............. B65D 81/325 222/137

(Continued)

FOREIGN PATENT DOCUMENTS

DE 10 2016 213 882 A1 2/2018

OTHER PUBLICATIONS

Stolt et al., U.S. Appl. No. 18/256,594, filed Jun. 8, 2023.

(Continued)

*Primary Examiner* — Paul R Durand
*Assistant Examiner* — Randall A Gruby
(74) *Attorney, Agent, or Firm* — Grüneberg Global IP, PLLC

(57) ABSTRACT

A dispenser for compound-containing containers includes a receiving chamber for a container; at least one push rod displaceable relative to the receiving chamber; a motor for moving the at least one push rod; a control unit for controlling the motor; a main switch for activating the motor; and an operation selection switch for switching between different operation modes and having a discard position. The control twit is configured to dispense a predetermined discard amount of the compound when the operation selection switch is set to the discard position and the main switch is triggered. The dispenser provides an automated discard function, which helps the user to discard the correct amount of compound before starting normal applications. With the dispenser, a procedure of initializing a compound-containing container is improved, to increase the security of the application.

14 Claims, 3 Drawing Sheets

(56) References Cited

U.S. PATENT DOCUMENTS 5,441,175 A * 8/1995 Jacobsen ........... B05C 17/00553 222/137
5,672,155 A 9/1997 Riley et al.
5,816,445 A * 10/1998 Gardos ................. B01F 35/882 222/137
6,129,244 A * 10/2000 Horth ................ B05C 17/00566 222/326
6,216,822 B1 * 4/2001 May ........................ F16N 11/08 184/26
6,394,643 B1 * 5/2002 Bublewitz ................ A61C 5/64 366/326.1
6,578,738 B1 * 6/2003 Keller ................ B65D 75/5883 222/326
6,682,601 B1 * 1/2004 Beebe ................. B05C 17/0103 118/679
6,854,349 B2 * 2/2005 Brandhorst ....... B05C 17/00566 73/54.32
6,889,872 B2 * 5/2005 Herman ............ B05C 17/00506 222/137
6,932,237 B2 * 8/2005 Heymann ......... B05C 17/00553 222/326
7,116,071 B2 * 10/2006 Glasgow ................ H02H 9/025 318/281
8,418,891 B1 4/2013 Harris
8,602,260 B2 * 12/2013 Pierson ................ A61C 9/0026 222/102
8,684,229 B2 * 4/2014 Harre .................. B01F 35/7174 222/145.6
8,783,526 B2 * 7/2014 Strobel-Schmidt .......................... B05C 17/0123 222/391
9,359,122 B2 * 6/2016 Schmid ................. G01F 11/023
9,931,665 B2 * 4/2018 Cheung ................. B05C 17/012
10,265,721 B2 * 4/2019 Beckett ............... B05C 17/0116
10,407,234 B2 * 9/2019 Gabrielson ........... B05C 5/0225
10,640,280 B2 * 5/2020 Herman .................... H02P 3/06
10,682,666 B2 * 6/2020 Routen ................. B05C 5/0233
10,758,935 B2 * 9/2020 Beebe ..................... H04L 67/02
10,894,272 B2 * 1/2021 Turner .................... H04W 4/80
11,130,150 B2 * 9/2021 Welch ................... B05C 17/012
11,458,503 B2 * 10/2022 Kuhn ................ B05C 17/00556
11,465,170 B2 * 10/2022 Turner ..................... A61C 5/64
11,673,160 B2 * 6/2023 Kuhn ................ B05C 17/00553 222/135
12,251,726 B2 * 3/2025 Schäuble .......... B05C 17/00596
12,270,214 B2 * 4/2025 Pucella .................... B25J 18/00
12,398,843 B2 * 8/2025 Eisenbacher ........... F16N 11/08
12,465,943 B2 * 11/2025 Stolt ................... B05C 17/0103
12,496,611 B2 * 12/2025 Stolt ................... B05C 17/0103
12,564,857 B2 * 3/2026 Stolt ................... B05C 17/0103
2004/0045982 A1 * 3/2004 Herman ............ B05C 17/00506 222/145.5
2008/0144426 A1 * 6/2008 Janssen ............... B01F 27/1125 366/162.3
2009/0101673 A1 * 4/2009 Alioto ................. B05C 17/0103 222/113
2010/0163573 A1 7/2010 Wegelin et al.
2011/0151042 A1 * 6/2011 Strobel-Schmidt ..... B29C 48/02 425/145
2013/0020350 A1 * 1/2013 Gardos ................... A01M 3/00 222/113
2015/0266050 A1 * 9/2015 Beckett ............... B05C 17/0103 222/310
2016/0107187 A1 * 4/2016 Beebe ................. B05C 17/0103 222/1
2016/0114348 A1 * 4/2016 Cheung ................. B05C 5/0225 222/333
2016/0169446 A1 * 6/2016 Peters ...................... H04B 5/77 222/23
2021/0272683 A1 * 9/2021 Friedman ............... G16H 20/40
2022/0000093 A1 * 1/2022 Ko ...................... A01M 1/2055
2022/0339590 A1 * 10/2022 Turner ................ B05C 17/0103
2023/0158541 A1 * 5/2023 Schäuble ............ B05C 17/0103 427/8
2023/0364637 A1 * 11/2023 Stolt ................... B05C 11/1002
2024/0017287 A1 * 1/2024 Stolt ................... B05C 17/0103
2024/0017288 A1 * 1/2024 Wiedemann ........ B05C 17/0103
2024/0100560 A1 * 3/2024 Stolt ................. B05C 17/00583
2025/0135489 A1 * 5/2025 Henry ................. B05C 17/0103
2025/0152928 A1 * 5/2025 Hirschl ................ A61C 19/066

OTHER PUBLICATIONS

Stolt et al., U.S. Appl. No. 18/256,408, filed Jun. 7, 2023.
Stolt et al., U.S. Appl. No. 18/256,344, filed Jun. 7, 2023.
U.S. Appl. No. 18/256,594, filed Jun. 8, 2023, Stolt et al.
U.S. Appl. No. 18/256,408, filed Jun. 7, 2023, Stolt et al.
U.S. Appl. No. 18/256,344, filed Jun. 7, 2023, Stolt et al.
International Search Report issued Jan. 26, 2022, in PCT/EP2021/081800, 5 pages.
Written Opinion issued Jan. 26, 2022, in PCT/EP2021/081800, 6 pages.
Office Action received for U.S. Appl. No. 18/256,344, mailed on Apr. 10, 2025, 8 pages.

* cited by examiner

DISPENSER AND A CONTROL METHOD OF THE DISPENSER

CROSS-REFERENCE TO RELATED APPLICATIONS

This application the National Stage entry under § 371 of International Application No. PCT/EP2021/081800, filed on Nov. 16, 2021, and which claims the benefit of priority to European Application No. 20212973.0, filed on Dec. 10, 2020. The content of each of these applications is hereby incorporated by reference in its entirety.

BACKGROUND OF THE INVENTION

TECHNICAL FIELD

The present invention relates to a method of controlling a dispenser for compound-containing containers. The present invention also relates to a dispenser for compound-containing containers.

DESCRIPTION OF RELATED ART

A dispenser is used for dispensing compounds which are packaged in containers, such as mortar and sealing compounds, at a site of application. The containers include, for example, hard cartridges having one or more receiving chambers for one or more components of the compound to be dispensed which are provided directly or packaged, e.g. in foil packs, in the receiving chambers of the cartridge. The term "container" further includes foil packs which are filled with one or more compounds to be dispensed and which are inserted in a separate receiving body or in a receiving body mounted on the dispenser.

It is well known that the dispenser can be two-component or multicomponent systems in which at least two different components are stored in separate chambers of the same cartridge or in separate cartridges. For the two-component or multicomponent systems, the components are generally guided to a dynamic or static mixer that enable the components to be combined. Examples of multicomponent systems include adhesives, mortar, or sealing materials which only harden after the mixing of the two components.

To ensure correct mixing of the components, the mixer of the foil packs or hard cartridges must be initialized by discarding a certain amount of compound. The prior products are only mentioning the color of the compound to detect a correct mixing but didn't define a certain amount of discard. If the color of the discarded compound is stable, the initialization of the mixer is finished. This procedure includes a high risk of an insufficient discard, which will lead to a decrease of the load capacity of the anchor system. In the state of art, a volume for the discard is defined, and this could be set by the dosing wheel of the dispenser. Additionally, the mixer must be filled beforehand, and the defined volume has to be dispensed out of the mixer. Based on this, there is also the risk, that the user is not filling the mixer beforehand and the discard volume is still filled in the mixer. If this discard volume is then applied to the drill hole of the anchor, the load capacity of the anchor is decreased, too.

Moreover, for the different sizes of the mortar containers portfolio, the user faces the issue, that different components types and cartridge sizes, require different volumes of discard.

SUMMARY OF THE INVENTION

Thus, if an application run gets interrupted, not the preselected amount of the compound will be dispensed, but the missing amount of the compound. With this function, the user will be able to proceed the application without additional chemical or compound wastage.

A drawback of the known approach is that there is a high risk of an insufficient discard, which will lead to a decrease of the load capacity of the anchor system.

It is an object of the present invention to provide a method for controlling a dispenser to improve the procedure of initializing the dispensing of a compound container and to increase the security of the application.

The method of the present invention for controlling the dispenser includes the following steps: selecting a discard position via the operation selection switch; identifying the information on the container; a control unit of the dispenser selecting a predetermined discard amount of the compound based on the information; triggering the main switch by an user to activate a motor to move at least one push rod; the predetermined discard amount of the compound being dispensed.

Thus, an automatic discarding function will be operated on the dispenser. When the user selects the discard position via an operation mode switch, for example, a dosing wheel, and triggers the main switch to initiate the discard. The motor drives the push rods to move, then the compounds are dispensed from the container. The dispenser performs discarding as long as the main switch is pressed. When the dispensed amount of the compound is equal to the predetermined discard amount stored in the dispenser, the discard procedure is completed. This automatic discard helps users to discard the correct amount of the compound, lowest the risk of insecurity of the application due to insufficient discarding.

Preferably, the predetermined discard amount is a value indicating a defined movement of the at least one push rod. Hereby, once the movement of the push rod is equal to the defined movement, the amount of the compound that has been dispensed is equal to the predetermined discard amount.

Preferably, the method of controlling a dispenser according to the present invention further comprises that at least one sensor detects the movement of the at least one push rod. Said at least one sensor is electronically connected to the control unit. Therefore, when the discard is initiated, the sensor can detect the movement of the position of the push rod and send the signal of the movement of the push rod to the control unit.

Preferably, the predetermined discarding amounts for different compounds in the different containers are stored in a memory module of the control unit. Since the compound-containing containers have different types and sizes, the predetermined discard amount differs between different pack/cartridge sizes. Moreover, even for the same size of the containers, the predetermined discard amount for different compounds in the same size of the containers may differ, too. To perform a correct discard, the predetermined discard amount for different compounds in the different containers shall be defined by the users or suppliers in advance and this data is stored in the memory module of the control unit. Alternatively, the information of the predetermined discarding amounts could also be stored on the containers. For example, the information could be available on a DMC or NFC or similar on the containers.

Preferably, the dispenser comprises a receiver configured to read the information on the container. The receiver is electronically connected to the control unit. A data process module of the control unit is configured to select the predetermined discard amount of the compound stored in the memory module based on the information read by the receiver. The information on the containers includes the information showing the types of the compound and/or the sizes of the containers. When the container is inserted in the receiving chamber, the receiver reads the information about the size of the container and/or the type of the compound in the container, and the data module of control unit selects the corresponding a correct discard value stored in the memory module of the control unit based on the information on the container read by the receiver. Hereby, the correct predetermined discard amount for the compound in the container is determined by the control unit automatically, and the dispenser will just dispense the predetermined discard amount accordingly in the discard procedure.

According to the method of controlling the dispenser, the control unit terminates the movement of the push rod once the predetermined discard amount of the compound has been dispensed. The push rod starts moving and the compound is dispensed out of the container by the moving of the push rod. As the predetermined discard amount is represented by a defined movement of the push rod, when the movement of the push rod is equal to the defined movement, then the dispensed amount is equal to the selected predetermined discarding amount. Typically, after finalization of the discard, the rods will drive backwards by preferably 3 mm to release the pressure in the containers and to avoid a dripping of the compound out of the mixer. Then the discard procedure is completed automatically.

Preferably, the control method according to the invention provides a user-perceivable signal to reflect the discard status. The user-perceivable signal is generated by an indicator unit, which is electrically connected to the control unit. This allows the user to notice the correct amount of the compound to be discard has already been dispensed and he can continue to perform the normal applications next. Advantageously, the indicator unit is electrically connected to the control unit via a separate signal input. For example, a LED will be lighted for a positive feedback after finalizing discard. If the discard was aborted by the user or other circumstances like an empty battery, a different signal would be alerted this to the customer. For example, the LED will light up red, if the discard was not finalized properly.

Preferably, the compound contained in container including two components, a mixer being attached to the receiving chamber, the method further comprising a step: filling up the mixer before selecting the discard position. Based on the high tolerance of the foil pack length, the needed travel of the push rods to fill up the mixer is quite unstable. Caused by this, the discard amount differs for each foil pack. Therefore, the smart discard function needs a manual filling of the mixer by the user. Afterwards, the dispenser can predict the discard amount based on the push rod position and dispense the necessary amount of the compound by processing the travel of the push rod.

The present invention also provides a dispenser for compound-containing containers, comprising: a receiving chamber for a container; at least one push rod displaceable relative to the receiving chamber; a motor for moving the at least one push rod; a control unit for controlling the motor; a main switch for activating the motor and an operation selection switch for switching between different operation modes; the operation selection switch comprising a discard position, the control unit being configured to dispense a predetermined discard amount of the compound when the operation selection switch is set to the discard position and the main switch is triggered.

Such a dispenser provides an automated discard function, which helps the user to discard the right amount of compound before starting the normal applications. An automated discard mode could be selected with an operation selection switch. Typically, the operation selection switch may be a dosing wheel of the dispenser. By setting the operation switch in the discard position, the tool performs the discard as long as the main switch is triggered.

Preferably, the dispenser comprises at least one sensor configured to detect a movement of the at least one push rod. Said at least one sensor is electronically connected to the control unit. The predetermined discard amount of the compound is a value indicating a defined movement of the at least one push rod.

Preferably, the control unit comprises control unit comprises a memory module configured to store the predetermined discard amount of the compound for different containers. Moreover, the dispenser comprises a receiver configured to read the information of the container and a data process module of the control unit configure to select the corresponding predetermined discard amount of the compound stored in the memory module based on the information. Since the compound-containing containers have different types and sizes, the predetermined discard amount differs between different pack/cartridge sizes. The receiver, for example, may be a device which can scan a radio frequency tag or a data matrix code. The receiver reads the information of the containers by scanning the RF Tag or data matric code, and the control unit identifies the types of the compounds and/or the sizes of the containers, then determines the discarding amount based on different compounds types and/or container's sizes.

Preferably, the dispenser further comprises an indicator unit electrically connected to the control unit and generating a user-perceivable signal to reflect the discard status.

Preferably, the compound contained in container includes two components. The push rods are also two, being inserted into the receiving chamber to drive and dispense the two compounds respectively. The dispenser with automated discard function is advantageous for the compound to be dispensed with more than two components, since a mix of the two components is a must and is very important for the quality of the following applications.

BRIEF DESCRIPTION OF THE DRAWINGS

The present invention is explained in greater detail below with reference to an exemplary embodiment. In the drawing.

DETAILED DESCRIPTION

Figure 1:
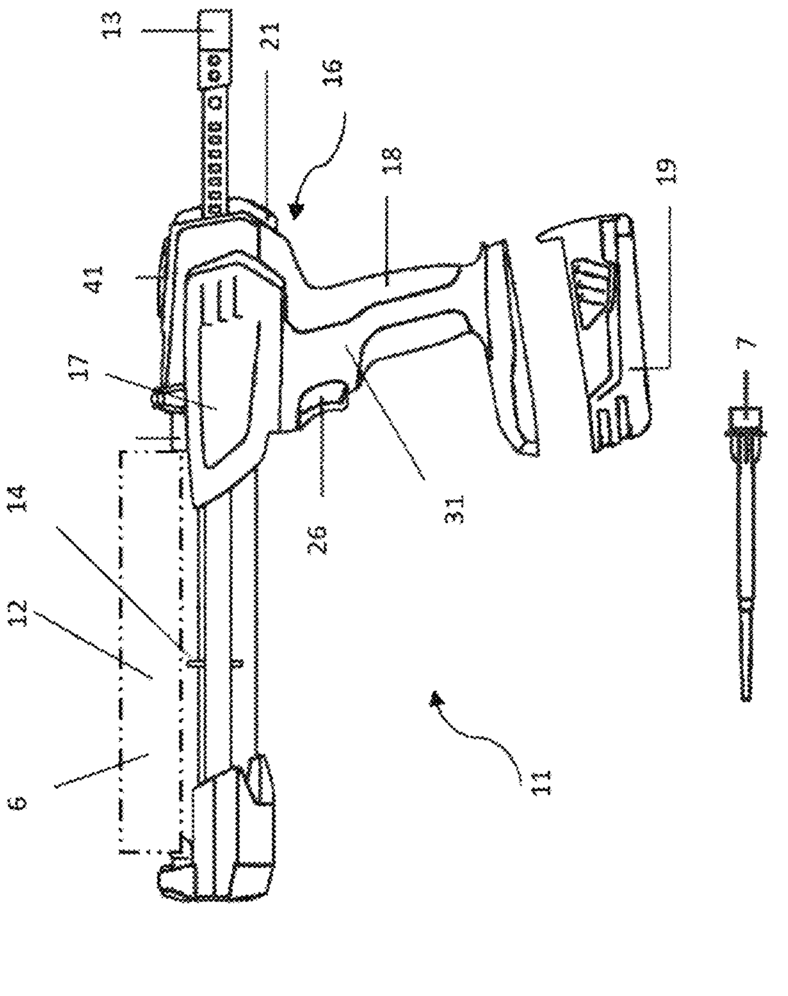
FIG. 1 is a top, front perspective view of an embodiment of a dispenser.

Dispenser 11 for compound-containing containers 6, as shown in FIG. 1, has a receiving chamber 12 for container 6, a push rod 13 which is displaceable relative to receiving chamber 12, and an electrically operable dispensing mechanism 16. A pressure piston 14 for applying pressure to container 6 and/or to the compound contained therein is provided on the end of push rod 13 facing receiving chamber 12. Operation of dispensing mechanism 16 causes push rod 13 to move into receiving chamber 12, thereby pressurizing the compound contained in container 6, causing it to be extruded through outlet of container 6. The compound contained in container 6 includes one or several components. According to a preferred embodiment of the invention, the compound contained in container 6 includes two compounds, thereby two push rods being displaceable relative to the receiving chamber 12. A mixer 7 is advantageously provided at outlet of container 6, said mixer ensuring complete mixing of the components prior to being discharged through the outlet.

Dispensing mechanism 16 is accommodated in a housing 17 having a handle 18 extending therefrom. A power supply 19 in the form of a battery pack is detachably connected to the free end of handle 18. Dispensing mechanism 16 includes a motor 21 which, via a transmission mechanism, drives a drive wheel (not shown) meshing with teeth on push rod 13, thereby moving the push rod 13.

Handle 18 is further provided with a main switch 26 in the form of a push button for activating the motor 21. Also provided is a control unit 31 for controlling motor 21, said control unit having a power module for connecting the motor 21 to power supply 19.

Figure 2:
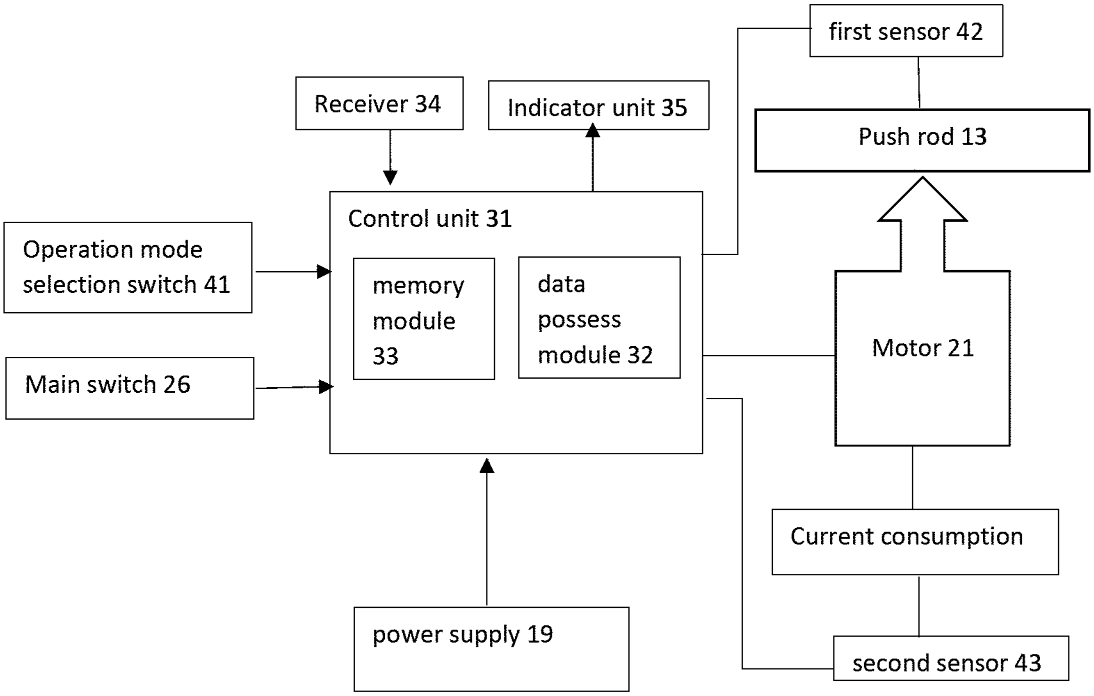
FIG. 2 is a schematic diagram of the dispenser of FIG. 1 including a control unit.

As shown schematically in FIG. 2, the main switch 26 is electrically connected to control unit 31. Furthermore, an operation selection switch 41 is provided for switching between different operation modes and adjusting the amount of compound to be dispensed with each full stroke. This operation selection switch is electrically connected to control unit 31. Operation selection switch 41 includes a potentiometer and provides a plurality of possible settings for the dispensing of correspondingly defined amounts of the compound to be extruded, including a "zero" position, in which actuation of main switch 26 does not cause motor 21 to be connected to power supply 19, and a "continuous" position, in which motor 21 is connected to power supply 19 for as long as main switch 26 is actuated. Moreover, the operation selection switch 41 further includes a "discard" position, in which the dispenser performed an automatic discard.

According to a preferred embodiment of the invention, the dispenser comprises at least one sensor. A first sensor 42 for detecting the movement of the at least one push rod. More preferably, the dispense includes a second sensor 43, for detecting the current consumption to show the initiation of the discard. The first and second sensors 42, 43 are both electronically connected to the control unit 31.

The control unit 31 comprises a memory module 33 configured to store the necessary discard amounts of compounds for different containers/compounds. Since the compound-containing containers have different types and sizes, for example, some compounds are available in 330 ml, 500 ml and 580 ml, the necessary amount of discard differs between different pack/cartridge sizes. The specified discarding amounts of different types of the compounds packaged in different pack/cartridges sizes/types are the predetermined discard amounts which are stored in the memory module 33 of the control unit in advance. Alternatively, the information of the predetermined discarding amounts could also be stored on the containers. For example, the information could be available on a DMC or NFC or similar on the containers.

The dispenser 11 further comprises a receiver 34 configured to read the information on the container 6; the receiver 34 being electronically connected to the control unit 31. The receiver 34, for example, may be a device which can scan a radio frequency tag or a data matrix code. Since the dispenser can only recognize the size of the foil pack/cartridge by detecting the position of the push rods via sensors, the differences between different types of compounds with the same package size cannot be detected. With the receiver reading the information om the containers, for example, the types of the compounds, the dispenser could detect the compound type, e.g. with a radio frequency tag or by scanning a data matrix code, the different amounts for compounds types could be distinguished.

Moreover, the control unit 31 further comprises a data process module 32 configure to select the predetermined discard amounts stored in the memory module based on the information. When the receiver 34 reads the RF tag or data matrix code, the data process module 32 processes the information and selects the predetermined discard amount of the compound corresponding to the information on the containers 6 which are stored in the memory module in advance.

Moreover, an indicator unit 35 is provided which is electrically connected to control unit 31 and which generates a user-perceivable signal when the discard procedure has been completed. Advantageously, the user-perceivable signal is an audible signal and/or a visual signal. For example, a correct performed discard by the user will be recognized due to the automatic stop of the dispenser and a LED feedback. The LED will be light green for a positive feedback. If the discard was aborted by the user or other circumstances like an empty battery, the dispenser will signalize this the user. Best case, the LED will light up red, if the discard was not finalized properly. In this case, the user has to finish the discard or restart the procedure.

Figure 3:
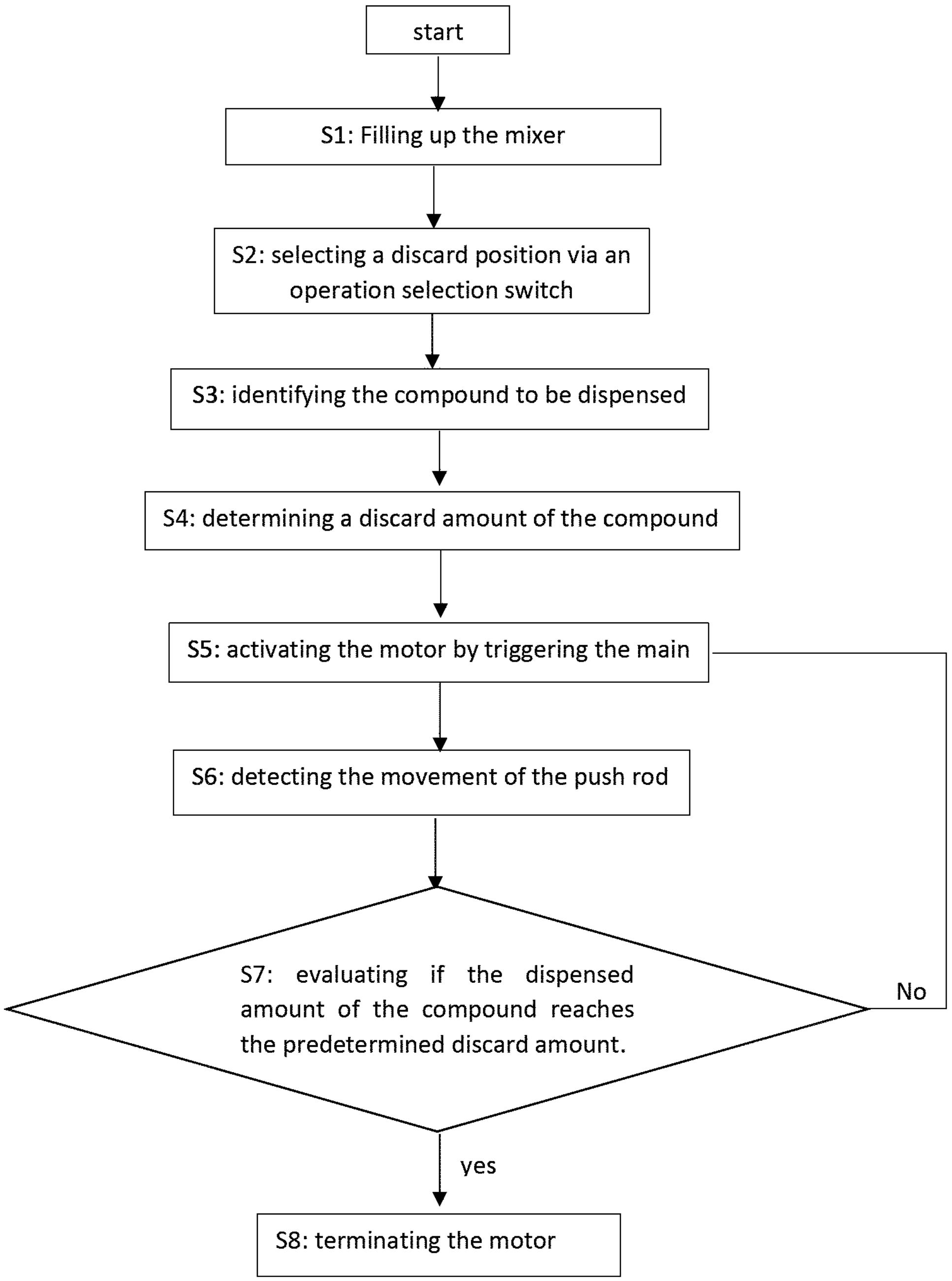
FIG. 3 illustrate the flow chart of the operating method of the dispenser of FIG. 1.

The method for controlling the dispenser 11 will now be described with reference to FIGS. 2 and 3. After insertion of a new or partially used container 6 into receiving chamber 12 of dispenser 11, to ensure correct mixing of the components, the mixer of the container, e.g. foil packs or hard cartridges, must be initialized by discarding a certain amount of compound. Firstly, for the compound in container including of two components, especially when the container is a foil pack, due to the high tolerances of the foil pack length, the needed movement of the push rods 13 to fill up the mixer is quite unstable. Caused by this, the discard amount differs for each foil pack. Therefore, a "smart discard" function needs a manual filling of the mixer by the user. Afterwards, the control unit could predict the discard amount based on the push rod position and dispense the necessary amount of compound by processing the movement of the push rods. Therefore, the first step 51 of the method is to fill up the mixer.

In order to dispense the correct amount of discard material, the operation selection switch 41 is advantageously set to the "discard" position (S2).

According to one preferred embodiment of the invention, next step S3: identifying the compound type and/or the container sizes. As the necessary amount for discarding differs between different pack/cartridge sizes. This predetermined discard amount has been determined once the container is produced. For example, for the Hilti RE 500, the necessary amount for discarding shall be 15 ml. This step could be done by the sensors detecting the position of the push rod, but the sensors can only recognize the size of the container, the differences between different types of mortar with the same package size cannot be detected. Preferably, the dispenser further comprises a receiver 34, which is electronically connected to the control unit. The receiver 34 can identify the information on the container. The information may be the type of the compound in the container and/or the types/sizes of the containers, e.g. foil pack or cartridge. With the receiver, for example, a radio frequency tag or by scanning a data matrix code, the different amounts for mortar types could be distinguished.

Then, S4: the control unit determines a predetermined discard amount of the compound. As the amount of compound to fill the mixer and the predetermined discard amount the discard are stored in the memory module 33 of the control unit 31 beforehand, the data process module 32 of control unit will select a correct predetermined discard amount based on the container's size/type or compounds to be dispensed.

Next, S5: the main switch 26 is triggered. The current consumption of the dispenser increases, which can be detected by the second sensor 43. This state could be used to determine the start of the discard procedure.

The control unit 31 actives the motor to drive the push rod forward, in the meantime, the movement of the push rod 13 is detected by the first sensor 42. (S6). Both sensors 42, 43 send the signals to the control unit 31.

Then in the next step S7: the control unit will evaluate if the dispensed amount of the compound reaches the predetermined discard amount. As the predetermined discard amount is a value indicating a defined movement of the at least one push rod, once the movement of the push rod 13 detected by the first sensor 42 is equal to the defined movement, the amount of the compound that has been dispensed is equal to the predetermined discard amount selected by the control unit. The main switch 26 is actuated until the amount of the dispensed compound meets up with the predetermined discard amount. Then it comes to step S8: the control unit 31 terminates the running of the motor 21. Typically, after finalization of the discard, the rods will drive backwards by preferably 3 mm to release the pressure in the containers and to avoid a dripping of the compound out of the mixer. Finally, a correct discard is completed automatically.

Preferably, a correct performed discard by the user will also be recognized by an indicator unit 35. The indicator unit 35 generate a user-perceivable signal to let the user be aware of the status of the discard procedure. In a preferred embodiment, the indicator unit 35 could be a LED feedback. For example, the LED will be light green for a positive feedback. If the discard was aborted by the user or other circumstances like an empty battery, the indicator unit 35 will signalize this to the customer. Best case, the LED will light up red, if the discard was not finalized properly. In this case, the user has to finish the discard or restart the procedure.

Using the dispenser according to the present invention an operator is able in a convenient manner to perform a correct discard, thereby increasing the security of the application. While only selected embodiments have been chosen to illustrate the present invention, it will be apparent to those skilled in the art from this disclosure that various changes and modifications can be made herein without departing from the scope of the invention. Thus, the foregoing descriptions of the embodiments according to the present invention are provided for illustration only, and not for the purpose of limiting the invention.

The invention claimed is:

1. A dispenser for a compound-containing container, comprising:

a housing comprising a handle, and a receiving chamber configured to receive a compound-containing container, the compound-containing container comprising at least two separate compound components and a mixer configured to combine the compound components during dispensing;

at least one push rod disposed within the housing and displaceable relative to the receiving chamber;

a motor disposed within the housing and operably coupled to the at least one push rod, the motor configured to drive movement of the at least one push rod;

a control unit disposed within the housing and electrically coupled to the motor, the control unit configured to control actuation of the motor;

a main switch positioned on the handle and electrically connected to the control unit, the main switch configured for on/off activation of the motor when activated by a user;

an operation selection switch electrically connected to the control unit and configured to switch between a plurality of operation modes, the operation selection switch including a discard position corresponding to a discard mode; and a receiver configured to read information stored on the compound-containing container, the information indicating at least one of a type and/or size of the at least two separate compound components contained therein, the receiver being electronically connected to the control unit;

a memory module of the control unit configured to store values corresponding to a predetermined discard amount associated with the discard mode for one or more compound-containing containers, each predetermined discard amount being predefined for initializing mixing of the at least two separate compound components in the mixer and being associated with the type and/or size of the compound-containing container, each predetermined discard amount corresponding to a defined movement distance of the at least one push rod sufficient to ensure mixing of the at least two separate compound components; and a data process module of the control unit configured to select the predetermined discard amount stored in the memory module based on the information read by the receiver, wherein the selected predetermined discard amount is automatically retrieved from the memory module without user entry of a dispensing volume; and wherein the control unit is configured to, upon the operation selection switch being set to the discard position and the main switch being activated by the user:

actuate the motor to move the at least one push rod in a dispensing direction, terminate actuation of the motor based on detection that the at least one push rod has moved the defined movement distance corresponding to the selected predetermined discard amount, thereby dispensing the predetermined discard amount of the at least two separate compound components from the compound-containing container through the mixer as an initialization discard to ensure proper mixing of the at least two separate compound components prior to normal dispensing, and subsequently actuate the motor to move the at least one push rod in a reverse direction by a predefined reverse distance to release pressure within the compound-containing container and to prevent dripping of the at least two separate compound components from the mixer, wherein the predetermined discard amount is stored on the compound-containing container, and wherein the receiver is configured to read the predetermined discard amount from the compound-containing container.

2. The dispenser according to claim 1, wherein the dispenser comprises at least one sensor configured to detect the movement of the at least one push rod, said at least one sensor being electronically connected to the control unit.

3. The dispenser according to claim 1, wherein the memory module is further configured to store predetermined discard amounts for a plurality of different types of compound-containing containers and compounds.

4. The dispenser according to claim 3, wherein the data process module of the control unit is configured to select a corresponding predetermined discard amount stored in the memory module for each of the plurality of different types of compound-containing containers and compounds based on the information read by the receiver.

5. The dispenser according to claim 1, further comprising an indicator unit electrically connected to the control unit and configured to generate a user-perceivable signal to reflect a discard status.

6. The dispenser according to claim 1, wherein the mixer is attached to the receiving chamber for mixing the two components of the compound during dispensing.

7. The dispenser according to claim 1, wherein the control unit is configured to control the motor to fill the mixer with the at least two separate compound components prior to setting the operation selection switch to the discard position.

8. A method of operating a dispenser for a compound-containing container, the dispenser comprising a housing comprising a handle, a receiving chamber configured to receive a compound-containing container, at least one push rod, a motor operably coupled to the at least one push rod, a control unit electrically coupled to the motor, a main switch, an operation selection switch including a discard position corresponding to a discard mode, a receiver, a memory module, and a data process module, the method comprising:

receiving, in the receiving chamber, the compound-containing container, the compound-containing container comprising at least two separate compound components and a mixer configured to combine the compound components during dispensing;

reading, with the receiver, information stored on the compound-containing container, the information indicating at least one of a type or size of the at least two separate compound components contained therein;

selecting, with the data process module of the control unit, a predetermined discard amount stored in the memory module based on the information read by the receiver, wherein the selected predetermined discard amount is automatically retrieved from the memory module without user entry of a dispensing volume, each predetermined discard amount being predefined for initializing mixing of the at least two separate compound components in the mixer and corresponding to a defined movement distance of the at least one push rod;

setting the operation selection switch to the discard position;

activating the main switch;

actuating, with the control unit, the motor to move the at least one push rod in a dispensing direction;

terminating, with the control unit, actuation of the motor based on detection that the at least one push rod has moved the defined movement distance corresponding to the selected predetermined discard amount, thereby dispensing the predetermined discard amount of the at least two separate compound components from the compound-containing container through the mixer as an initialization discard to ensure proper mixing of the at least two separate compound components prior to normal dispensing;

subsequently actuating, with the control unit, the motor to move the at least one push rod in a reverse direction by a predefined reverse distance to release pressure within the compound- containing container and to prevent dripping of the at least two separate compound components from the mixer; and reading, with the receiver, the predetermined discard amount stored on the compound-containing container.

9. The method according to claim 8, further comprising detecting, with at least one sensor electronically connected to the control unit, the movement of the at least one push rod.

10. The method according to claim 8, further comprising storing, in the memory module of the control unit, predetermined discard amounts for a plurality of different types of compound-containing containers and compounds.

11. The method according to claim 10, further comprising selecting, with the data process module of the control unit, a corresponding predetermined discard amount stored in the memory module for each of the plurality of different types of compound-containing containers and compounds based on the information read by the receiver.

12. The method according to claim 8, further comprising generating, with an indicator unit electrically connected to the control unit, a user-perceivable signal to reflect a discard status.

13. The method according to claim 8, wherein the mixer is attached to the receiving chamber for mixing the two components of the compound during dispensing.

14. The method according to claim 8, further comprising controlling, with the control unit, the motor to fill the mixer with the at least two separate compound components prior to setting the operation selection switch to the discard position.

* * * * *